US012361536B2

(12) United States Patent
Kato et al.

(10) Patent No.: US 12,361,536 B2
(45) Date of Patent: Jul. 15, 2025

(54) EUV MASK INSPECTION DEVICE, EUV MASK INSPECTION METHOD, NON-TRANSITORY COMPUTER-READABLE MEDIUM STORING EUV MASK INSPECTION PROGRAM, AND EUV MASK INSPECTION SYSTEM INCLUDING A GRAY IMAGE BASED ON DESIGN DATA OF A PATTERN

(71) Applicant: Lasertec Corporation, Kanagawa (JP)

(72) Inventors: Yoshihiro Kato, Yokohama (JP); Hirokazu Seki, Yokohama (JP)

(73) Assignee: LASERTEC CORPORATION, Yokohama (JP)

( * ) Notice: Subject to any disclaimer, the term of this patent is extended or adjusted under 35 U.S.C. 154(b) by 597 days.

(21) Appl. No.: 17/647,340

(22) Filed: Jan. 6, 2022

(65) Prior Publication Data
US 2022/0222804 A1 Jul. 14, 2022

(30) Foreign Application Priority Data

Jan. 8, 2021 (JP) ................................. 2021-001826

(51) Int. Cl.
*G06T 7/00* (2017.01)
(52) U.S. Cl.
CPC .... *G06T 7/001* (2013.01); *G06T 2207/20081* (2013.01); *G06T 2207/30148* (2013.01)
(58) Field of Classification Search
CPC ........... G06T 7/001; G06T 2207/20081; G06T 2207/30148; G06T 2207/20084
See application file for complete search history.

(56) References Cited

U.S. PATENT DOCUMENTS

2005/0244049 A1* 11/2005 Onishi ..................... H01J 37/29
382/141
2007/0053580 A1* 3/2007 Ishikawa ................. G06T 7/001
382/149

(Continued)

FOREIGN PATENT DOCUMENTS

| JP | 2020501154 A | 1/2020 |
| WO | 2019133285 A1 | 7/2019 |
| WO | 2019216303 A1 | 11/2019 |

OTHER PUBLICATIONS

Japanese Patent Office, Office Action Issued in Application No. 2021-001826, Jul. 27, 2021, 8 pages. (Submitted with Machine Translation).

*Primary Examiner* — Hwa Andrew Lee
(74) *Attorney, Agent, or Firm* — McCoy Russell LLP

(57) ABSTRACT

An inspection device according to one aspect of the present disclosure includes an image capturing unit configured to capture an image of an EUV mask provided with a pattern, a storage unit configured to store a database intermediate file including a gray image obtained by pixelating a binarized image rasterized from design data of the pattern, and a processing unit configured to inspect the EUV mask on the basis of a captured image obtained by the image capturing unit capturing an image of the EUV mask. The processing unit includes a conversion model generated by a learning machine configured to perform learning by deep learning, a reference image generation unit configured to generate a reference image from the gray image by using the conversion model, and a comparison unit configured to compare the reference image with the captured image.

17 Claims, 16 Drawing Sheets

(56) References Cited

U.S. PATENT DOCUMENTS

2012/0033862 A1\* 2/2012 Wang .................. G06V 20/695
                                                              382/128
2018/0157933 A1 6/2018 Brauer et al.

\* cited by examiner

EUV MASK INSPECTION DEVICE, EUV MASK INSPECTION METHOD, NON-TRANSITORY COMPUTER-READABLE MEDIUM STORING EUV MASK INSPECTION PROGRAM, AND EUV MASK INSPECTION SYSTEM INCLUDING A GRAY IMAGE BASED ON DESIGN DATA OF A PATTERN

CROSS-REFERENCE TO RELATED APPLICATION

The present application claims priority to Japanese Patent Application No. 2021-001826, filed on Jan. 8, 2021. The entire contents of the above-listed application is hereby incorporated by reference for all purposes.

TECHNICAL FIELD

The present disclosure relates to an EUV mask inspection device, an EUV mask inspection method, a non-transitory computer-readable medium storing an EUV mask inspection program, and an EUV mask inspection system.

BACKGROUND

Examples of an inspection of a mask used for photolithography in a semiconductor device manufacturing process include a die to die inspection (hereinafter, referred to as a "DD inspection"), a mask to mask inspection (hereinafter, referred to as an "MtM inspection"), and a die to database inspection (hereinafter, referred to as a "DDB inspection").

In the DD inspection, a pattern of a mask is inspected by comparing captured images of two circuit patterns having the same shape in the mask.

In the MtM inspection, a captured image of a mask is acquired by a reference inspection device, and the captured image is set as a master image called a golden image. Then, a pattern of the mask is inspected by comparing a captured image captured by another inspection device with the golden image. When the inspection is performed, a difference between the inspection devices is strictly managed, and an error still remaining is then corrected by a conversion model using deep learning or the like.

In the DDB inspection, a reference image calibrated for each inspection device and for each mask is generated from design data of a mask. Then, a pattern of the mask is inspected by comparing the generated reference image with a captured image.

A person who manufactures a mask (hereinafter, referred to as a mask shop) has design data of a pattern of a mask, and can thus generate a reference image from the design data. To generate a reference image from design data, a process based simulation, an optical based simulation, and the like are performed as indicated in International Patent Publication No. WO2019/216303, for example.

The process based simulation reflects an error that occurs in a process when manufacturing an EUV mask. For example, the process based simulation is performed for an LER and a manufacturing error that occurs in resist development and etching when a pattern of an EUV mask is formed, a change in reflectance due to contamination when an EUV mask is used, pattern thickening due to oxidation, pattern thinning due to washing, and the like.

The optical based simulation reflects an error that occurs in an optical system when an image of an EUV mask is captured. For example, the optical based simulation is performed for an aberration of an optical system, a change in optical adjustment of an optical system, cloudiness of a mirror, and the like.

The mask shop performs the DDB inspection by comparing a captured image captured by an inspection device of the mask shop with a reference image generated by using the process based simulation and the optical based simulation described above.

On the other hand, a person who uses a mask (hereinafter, referred to as an "FAB") inspects a mask when the mask is received and when the mask is used. Examples of an inspection when a mask is used include an inspection after washing and an inspection after use for exposure. A mask after washing may experience change such as pattern thinning. Further, a mask after use for exposure may decrease in reflectance due to contamination by EUV light adhering to the mask.

When the DD inspection cannot be performed for a reason that a mask to be used is a single die mask, and the like, the FAB performs the MtM inspection. The FAB does not have design data. Further, a system for generating a reference image from design data is complex and expensive. Thus, it is not realistic for the FAB to perform the DDB inspection on each inspection device. Thus, the FAB performs "golden sharing" in which a golden image is shared by a plurality of inspection devices in the MtM inspection.

In golden sharing, for example, a captured image GA obtained by an inspection device KA capturing an image of a mask M is set as a golden image. Then, to inspect the mask M used for exposure or the like, the mask M is inspected by comparing a captured image GB obtained by an inspection device KB capturing an image of the mask M with the golden image GA. In this case, a change in the mask M itself due to use for exposure or the like, and an instrumental error between the inspection devices KA and KB are included.

Therefore, in the MtM inspection, it is necessary to keep the instrumental error between the inspection devices KA and KB at minimum, and a small error still generated needs to be corrected by using a conversion model using deep learning or the like. However, an inspection device using extreme ultraviolet (EUV) light has an extremely high resolution, and the accuracy required for each component is extremely high, and thus there is a problem that it is very difficult to keep the instrumental error between the inspection devices KA and KB small.

For example, as described above, it is conceivable that a change occurring in the mask M itself due to use of the mask M is corrected using the process based simulation, but it is difficult to correct the change with "golden sharing" for the EUV mask inspection device having a high resolution. Further, it is conceivable that the instrumental error between the inspection devices KA and KB is corrected using the optical based simulation, but it is difficult to correct the instrumental error with "golden sharing" for the EUV mask inspection device having a high resolution.

In this way, for example, in a case of an EUV mask, due to a high resolution, it is difficult to solve the object specific to the MtM inspection, namely, 1. the instrumental error between the inspection devices KA and KB, and 2. the change in the mask M itself. An inspection technique that can provide each inspection device with improved inspection accuracy is desired.

The present disclosure has been made in view of such a circumstance, and provides an EUV mask inspection device, an EUV mask inspection method, an EUV mask inspection program, and an EUV mask inspection system with improved inspection accuracy.

SUMMARY

An EUV mask inspection device according to one aspect of the present embodiment includes: an image capturing unit configured to capture an image of an EUV mask provided with a pattern; a storage unit configured to store a database intermediate file including a gray image obtained by pixelating a binarized image rasterized from design data of the pattern; and a processing unit configured to inspect the EUV mask on the basis of a captured image obtained by the image capturing unit capturing the image of the EUV mask, wherein the processing unit includes a conversion model generated by a learning machine configured to perform leaning by deep learning with a captured image for learning obtained by the image capturing unit capturing an image of a learning sample and the gray image corresponding to the captured image for learning being associated with each other, a reference image generation unit configured to generate a reference image from the gray image by using the conversion model, and a comparison unit configured to compare the reference image with the captured image.

In the EUV mask inspection device, the gray image may be a gray image formed from design data of the pattern by a mask shop that manufactures the EUV mask.

In the EUV mask inspection device, the learning machine may perform learning with a pattern used exclusively for learning, which is different from an exposure pattern provided on the EUV mask, as the learning sample.

In the EUV mask inspection device, the learning machine may generate the conversion model by performing learning with an EUV mask, which is the EUV mask after use for exposure, as the learning sample.

In the EUV mask inspection device, the learning machine may generate the conversion model by performing learning with an EUV mask, which is the EUV mask after washing, as the learning sample.

An EUV mask inspection method according to one aspect of the present embodiment is an inspection method for inspecting an EUV mask provided with a pattern by using an image capturing unit configured to capture an image of the EUV mask, and includes: a DBIF acquisition step of acquiring a database intermediate file including a gray image obtained by pixelating a binarized image rasterized from design data of the pattern; a learning step of generating a conversion model by performing learning by deep learning with a captured image for learning obtained by the image capturing unit capturing an image of a learning sample and the gray image corresponding to the captured image for learning being associated with each other; a reference image generation step of generating a reference image from the gray image by using the conversion model; and a comparison step of comparing the reference image with a captured image obtained by capturing an image of the EUV mask.

In the EUV mask inspection method, the gray image in the DBIF acquisition step may be a gray image formed from design data of the pattern by a mask shop that manufactures the EUV mask.

In the EUV mask inspection method, in the learning step, learning may be performed with a pattern used exclusively for learning, which is different from an exposure pattern provided on the EUV mask, as the learning sample.

In the EUV mask inspection method, in the learning step, the conversion model may be generated by performing learning with an EUV mask, which is the EUV mask after use for exposure, as the learning sample.

In the EUV mask inspection method, in the learning step, the conversion model may be generated by performing learning with an EUV mask, which is the EUV mask after washing, as the learning sample.

An EUV mask inspection program according to one aspect of the present embodiment is an inspection program for inspecting an EUV mask provided with a pattern by using an image capturing unit configured to capture an image of the EUV mask, and causes a computer to: acquire a database intermediate file including a gray image obtained by pixelating a binarized image rasterized from design data of the pattern; generate a conversion model by performing learning by deep learning with a captured image for learning obtained by the image capturing unit capturing an image of a learning sample and the gray image corresponding to the captured image for learning being associated with each other; generate a reference image from the gray image by using the conversion model; and compare the reference image with a captured image obtained by capturing an image of the EUV mask.

In the EUV mask inspection program, the gray image in the database intermediate file may be a gray image formed from design data of the EUV mask by a mask shop that manufactures the EUV mask.

The EUV mask inspection program may further cause a computer to perform learning with a pattern used exclusively for learning, which is different from an exposure pattern provided on the EUV mask, as the learning sample, when the conversion model is generated.

The EUV mask inspection program may further cause a computer to generate the conversion model by performing learning with an EUV mask, which is the EUV mask after use for exposure, as the learning sample, when the conversion model is generated.

The EUV mask inspection program may further cause a computer to generate the conversion model by performing learning with an EUV mask, which is the EUV mask after washing, as the learning sample, when the conversion model is generated.

An EUV mask inspection system according to one aspect of the present embodiment is an inspection system including a first inspection device and a second inspection device, wherein the first inspection device includes a first image capturing unit configured to capture an image of a first EUV mask provided with a pattern and a first processing unit configured to inspect the first EUV mask on the basis of a first captured image obtained by the first image capturing unit capturing an image of the first EUV mask, the second inspection device includes a second image capturing unit configured to capture an image of a second EUV mask provided with a pattern and a second processing unit configured to inspect the second EUV mask on the basis of a second captured image obtained by the second image capturing unit capturing an image of the second EUV mask, the first inspection device and the second inspection device share a storage unit configured to store a database intermediate file including a gray image obtained by pixelating a binarized image rasterized from design data of the pattern, the first processing unit includes a first conversion model generated by a first learning machine configured to perform learning by deep learning with a first captured image for learning obtained by the first image capturing unit capturing an image of a first learning sample and the gray image corresponding to the first captured image for learning being associated with each other, a first reference image generation unit configured to generate a first reference image from the gray image by using the first conversion model, and a first comparison unit configured to compare the first reference image with the first captured image, and the second processing unit includes a second conversion model generated by a second learning machine configured to perform learning by deep learning with a second captured image for learning obtained by the second image capturing unit capturing an image of a second learning sample and the gray image corresponding to the second captured image for learning being associated with each other, a second reference image generation unit configured to generate a second reference image from the gray image by using the second conversion model, and a second comparison unit configured to compare the second reference image with the second captured image.

In the EUV mask inspection system, the first learning machine may generate the first conversion model by performing learning with a first EUV mask, which is the first EUV mask after used for exposure, as the first learning sample, and the second learning machine may generate the second conversion model by performing learning with a second EUV mask, which is the second EUV mask after use for exposure, as the second learning sample.

In the EUV mask inspection system, the first learning machine may generate the first conversion model by performing learning with a first EUV mask, which is the EUV mask after washing, as the first learning sample, and the second learning machine may generate the second conversion model by performing learning with a second EUV mask, which is the second EUV mask after washing, as the second learning sample.

The present disclosure can provide an EUV mask inspection device, an EUV mask inspection method, an EUV mask inspection program, and an EUV mask inspection system with improved inspection accuracy.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Figure 1:
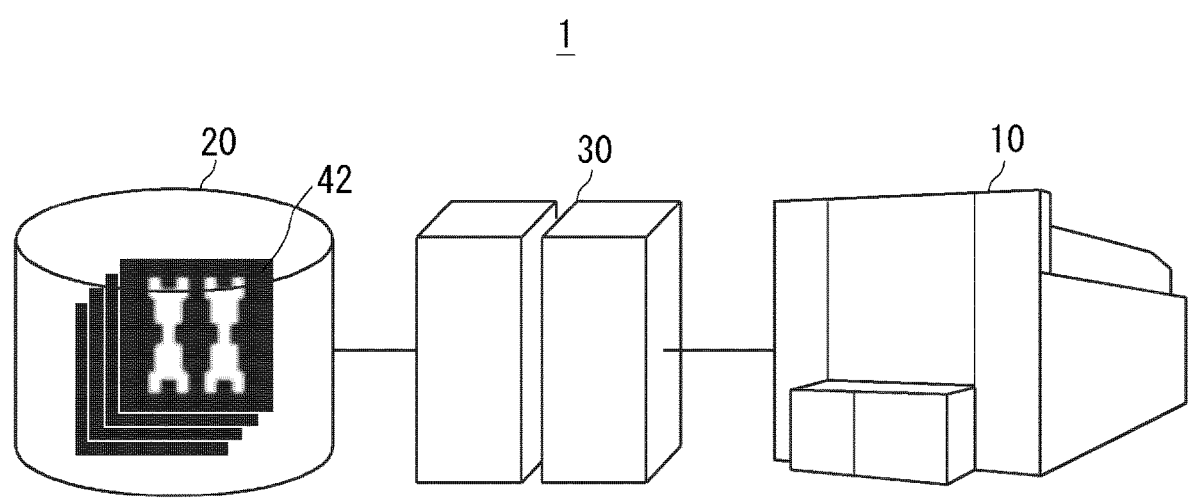
FIG. 1 is a schematic diagram illustrating an example of an inspection device according to a first embodiment.

A specific configuration according to the present embodiment will be described below with reference to the drawings. The following description indicates one embodiment of the present disclosure, and the scope of the present disclosure is not limited to the following embodiments. In the following description, the same reference numerals indicate substantially the same contents.

First Embodiment

An inspection device according to a first embodiment will be described. FIG. 1 is a schematic diagram illustrating an example of the inspection device according to the first embodiment. As illustrated in FIG. 1, an inspection device 1 includes an image capturing unit 10, a storage unit 20, and a processing unit 30. In FIG. 1, the image capturing unit 10, the storage unit 20, and the processing unit 30 are separately illustrated, but the storage unit 20 and the processing unit 30 may be integrally incorporated into the image capturing unit 10, or some of them may be configured separately. The inspection device 1 according to the present embodiment performs an inspection on the basis of a captured image obtained by capturing an image of an inspection target. For example, the inspection target is an EUV mask used for lithography using EUV light.

Hereinafter, as an example, description will be given using an EUV mask as the inspection target. In this case, the inspection device 1 is an EUV mask inspection device that inspects an EUV mask. The inspection device 1 captures an image of an EUV mask including a pattern, and compares the captured image with a reference image. The reference image is an image generated on the basis of a gray image 42 stored in the storage unit 20. Hereinafter, each configuration of the image capturing unit, the storage unit, and the processing unit will be described. Subsequently, an inspection method will be described.

Image Capturing Unit

Figure 2:
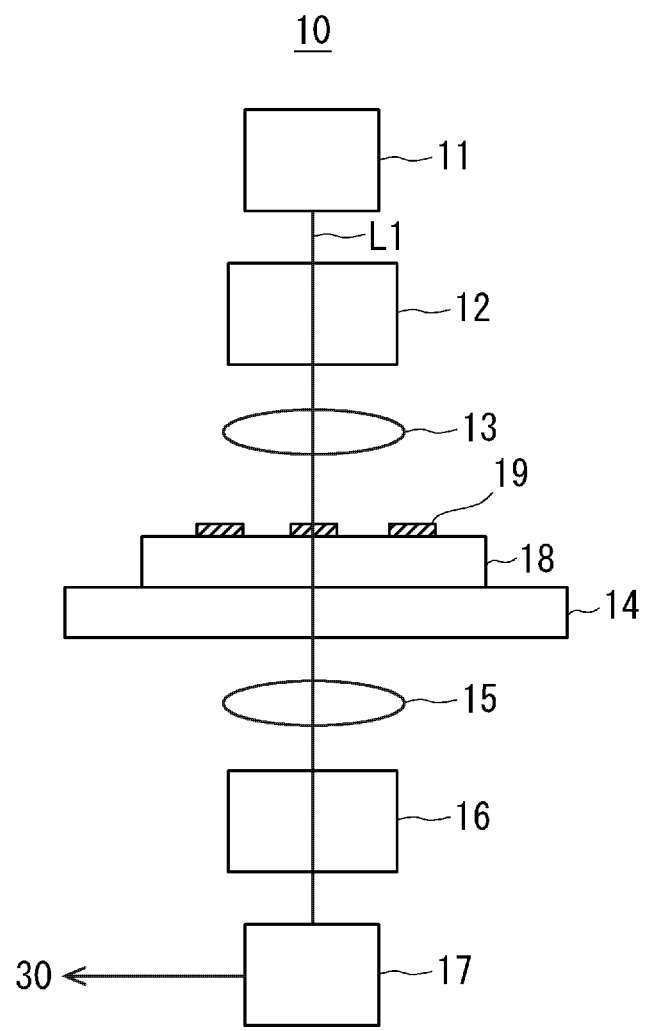
FIG. 2 is a configuration diagram illustrating an example of an image capturing unit in the inspection device according to the first embodiment.
Figure 3:
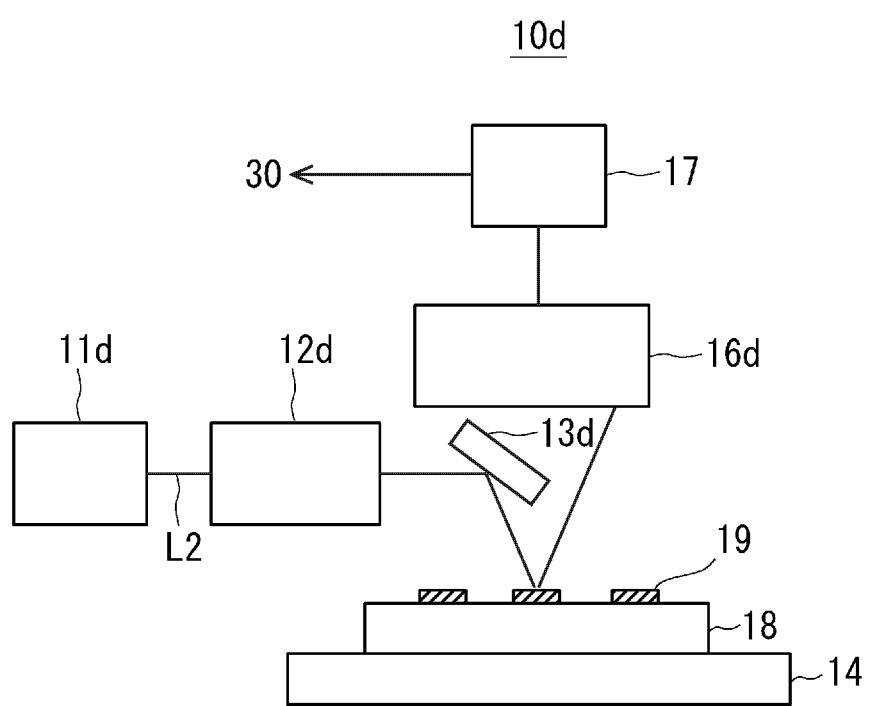
FIG. 3 is a configuration diagram illustrating an example of another image capturing unit in the inspection device according to the first embodiment.

FIG. 2 is a configuration diagram illustrating an example of the image capturing unit 10 in the inspection device 1 according to the first embodiment. FIG. 3 is a configuration diagram illustrating an example of another image capturing unit 10d in the inspection device 1 according to the first embodiment. As illustrated in FIG. 2, the image capturing unit 10 may capture an image of an EUV mask 18 by using transmission illumination, or, as illustrated in FIG. 3, the image capturing unit 10d may capture an image of an EUV mask 18 by using reflection illumination. As illustrated in FIG. 2, the image capturing unit 10 includes an illumination light source 11, an illumination optical system 12, a lens 13, a stage 14, a lens 15, a detection optical system 16, and a detector 17.

Description is given by using, as an inspection target, the EUV mask 18 provided with a pattern 19, but the inspection target is not limited to the EUV mask 18 as long as a pattern is provided. The inspection target may be a mask provided with a pattern and used for lithography using light other than EUV light, or may be a semiconductor device or the like. When the inspection target is the EUV mask 18, the image capturing unit 10 functions as an image capturing device that captures an image of the EUV mask 18 provided with the pattern 19.

The illumination light source 11 generates illumination light L1 with which the EUV mask 18 is illuminated. The illumination light L1 from the illumination light source 11 is incident on the illumination optical system 12. The illumination optical system 12 includes an optical component such as a relay lens and a mirror, and guides the illumination light L1 to the lens 13. The illumination optical system 12 may include an optical scanner and have an autofocus (AF) function. The illumination light L1 is condensed by the lens 13 and incident on the EUV mask 18. The lens 13 condenses the illumination light L1 onto a pattern surface of the EUV mask 18 on which the pattern 19 is formed. In this way, the EUV mask 18 is illuminated.

Transmitted light transmitted through the EUV mask 18 is transmitted through the transparent stage 14 and incident on the lens 15. The lens 15 is an objective lens, and condenses the transmitted light from the EUV mask 18. The transmitted light is incident on the detection optical system 16 via the lens 15. The detection optical system 16 includes an optical component such as an imaging lens and a mirror, and guides the transmitted light to the detector 17. The detection optical system 16 forms an image of the EUV mask 18 onto a light receiving surface of the detector 17.

The detector 17 is a line sensor or a two-dimensional array sensor configured by a charged coupled device (CCD) or a complementary metal oxide semiconductor (CMOS) camera including a plurality of pixels. A time delay integration (TDI) sensor can also be used as the detector 17. Therefore, the detector 17 captures an image of the EUV mask 18 provided with the pattern 19. A reflectance with respect to the illumination light L1 differs depending on the presence or absence of the pattern 19. For example, in a case of an EUV mask, a reflectance is low at a portion where the pattern 19 is formed, and a reflectance is high at a portion where the pattern 19 is not formed. Thus, the amount of received light varies depending on the presence or absence of the pattern 19.

The EUV mask 18 is placed on the stage 14. The stage 14 is an XY stage, and moves the EUV mask 18 in an XY direction. Movement coordinates of the stage 14 are input to the processing unit 30. Then, while the stage 14 causes the EUV mask 18 to move, the detector 17 captures an image of the EUV mask 18. In this way, a captured image of the entire EUV mask 18 or a desired region can be obtained. A transmittance with respect to the illumination light L1 differs depending on the presence or absence of the pattern 19. Thus, a brightness value, i.e., intensity of a detection signal greatly differs depending on the presence or absence of the pattern 19.

The detector 17 outputs a detection signal in accordance with the amount of received light to the processing unit 30. In this way, the captured image is input to the processing unit 30. A gray scale value in accordance with the amount of received light is set for each pixel of the captured image. The processing unit 30 performs image processing on a detection signal. For example, the processing unit 30 is a computer including a processor and a memory.

Note that, as illustrated in FIG. 3, an image of the EUV mask 18 may be captured by the image capturing unit 10d using reflection illumination. The image capturing unit 10d includes an illumination light source 11d, an illumination optical system 12d, a mirror 13d, a stage 14, a detection optical system 16d, and a detector 17.

The illumination light source 11d generates illumination light L2 with which the EUV mask 18 is illuminated. The illumination light L2 from the illumination light source 11d is incident on the illumination optical system 12d. The illumination optical system 12d includes an optical component such as an elliptic reflecting mirror, and guides the illumination light L2 to the mirror 13d. The illumination optical system 12d may also include an optical scanner and have an AF function. The illumination light L2 is reflected by the mirror 13d and incident on the EUV mask 18. The mirror 13d condenses the illumination light L2 onto a pattern surface of the EUV mask 18 on which the pattern 19 is formed. In this way, the EUV mask 18 is illuminated.

Reflected light reflected by the EUV mask 18 is incident on the detection optical system 16d. The detection optical system 16d includes an optical component such as a reflecting mirror, and guides the reflected light to the detector 17. The detection optical system 16d forms an image of the EUV mask 18 onto a light receiving surface of the detector 17.

Storage Unit

The storage unit 20 stores a database intermediate file (hereinafter, referred to as a DBIF) of the pattern 19 of the EUV mask 18. The storage unit 20 is a storage device that functions as a storage means for storing a DBIF of the pattern 19 of the EUV mask 18, such as a hard disk and a memory.

The DBIF includes a gray image obtained by pixelating a binarized image rasterized from design data of the pattern 19. Thus, the storage unit 20 stores the DBIF including the gray image. The gray image may be a gray image formed from the design data of the pattern 19 by a mask shop that manufactures an EUV mask.

Figure 4:
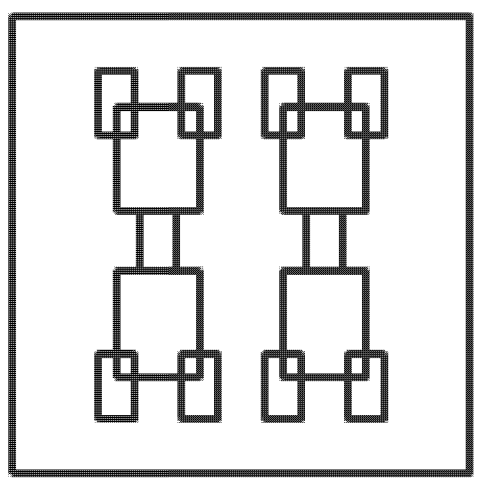
FIG. 4 is a diagram illustrating an example of design data of a pattern according to the first embodiment.
Figure 5:
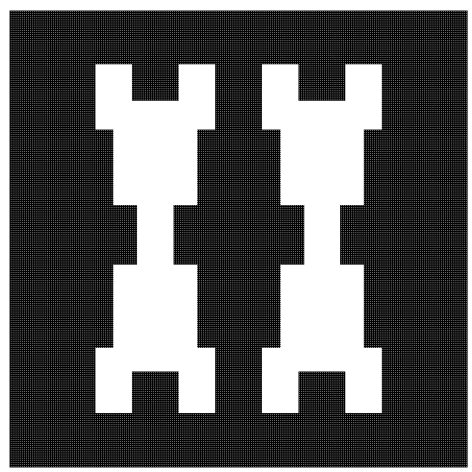
FIG. 5 is a diagram illustrating an example of a binarized image according to the first embodiment.
Figure 6:
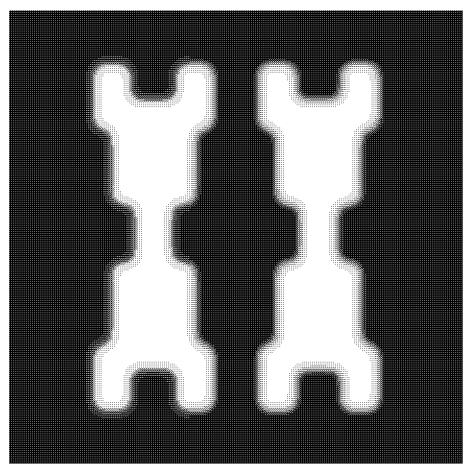
FIG. 6 is an image illustrating an example of a gray image according to the first embodiment.

FIG. 4 is a diagram illustrating an example of the design data of the pattern 19 according to the first embodiment. FIG. 5 is a diagram illustrating an example of a binarized image according to the first embodiment. FIG. 6 is an image illustrating an example of a gray image according to the first embodiment.

As illustrated in FIG. 4, the design data of the pattern 19 of the EUV mask 18 is, for example, CAD data. The design data is, for example, data for lithography, such as OASIS and MASK. For example, the design data is formed such that the pixel size is set to a size optimized for an inspection.

As illustrated in FIG. 5, the binarized image is an image based on the design data of the pattern 19 of the EUV mask 18, and is, for example, an image rasterized from the design data of the pattern 19. The binarized image is a binarized image according to the presence or absence of the pattern 19. A portion where the pattern 19 is formed has a first value (for example, 0), and a portion where the pattern 19 is not formed has a second value (for example, 1). In this way, a value of 0 or 1 is set to each pixel of the binarized image.

As illustrated in FIG. 6, for example, the gray image is obtained by pixelating the binarized image. The gray image is a gray-scaled image according to a binary value included in each pixel when the binarized image is divided into a plurality of pixels.

Figure 7:
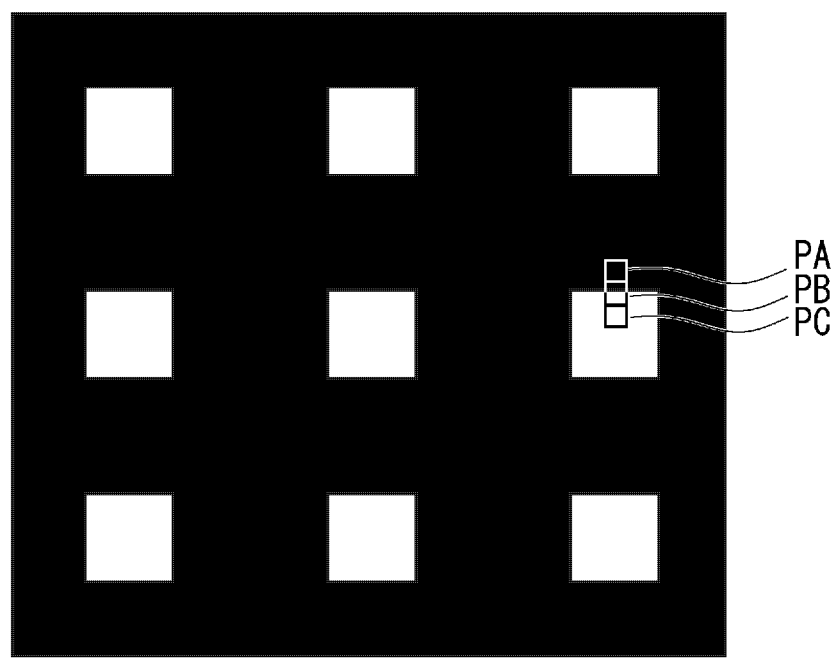
FIG. 7 is a diagram illustrating an example of another binarized image according to the first embodiment.
Figure 8:
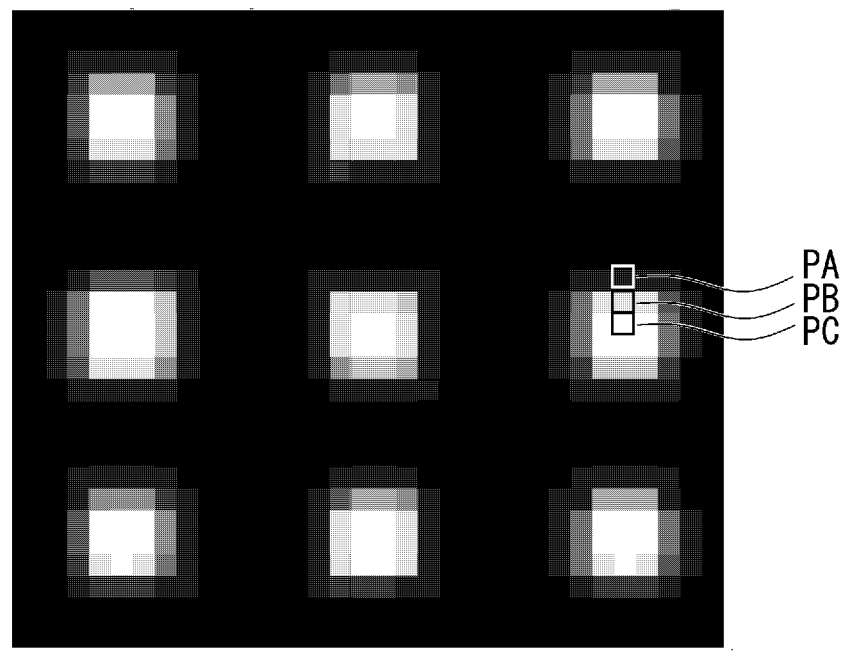
FIG. 8 is an image illustrating an example of another gray image according to the first embodiment.

FIG. 7 is a diagram illustrating an example of another binarized image according to the first embodiment. FIG. 8 is an image illustrating an example of another gray image according to the first embodiment.

As illustrated in FIG. 7, a pixel PA in a case where the binarized image is pixelated has a second value (for example, 1). A pixel PC in a case where the binarized image is pixelated has a first value (for example, 0). A pixel PB in a case where the binarized image is pixelated is a boundary portion between the first value and the second value.

As illustrated in FIG. 8, the pixel PA having the second value is indicated in black, for example. The pixel PC having the first value is indicated in white, for example. The pixel PB being the boundary portion between the first value and the second value is indicated by a gray scale interpolated from the pixel PA and the pixel PB, for example. A method of interpolation may be a suitably selected method such as linear interpolation. In this way, the gray image is obtained by pixelating the binarized image.

Processing Unit

The processing unit 30 is a processing device having a function as a processing means for performing processing of performing an inspection by a computer program. In other words, the processing unit 30 includes a memory that stores a program and a processor such as a CPU.

The following processing and defect detection processing may be performed by a processor executing a program. When the inspection method is implemented by a program, the program may be installed on the processing unit 30 of an existing inspection device.

Figure 9:
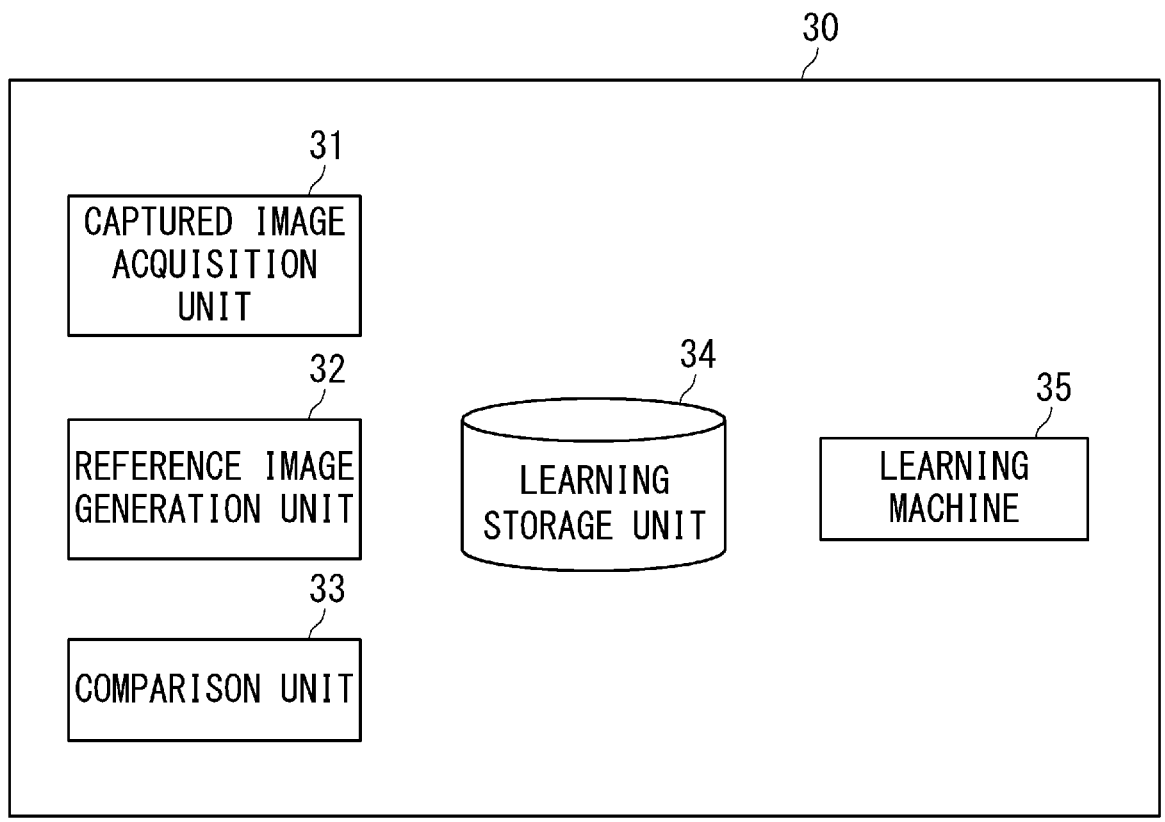
FIG. 9 is a block diagram illustrating an example of a configuration of a processing unit in the inspection device according to the first embodiment.

FIG. 9 is a block diagram illustrating an example of a configuration of the processing unit 30 in the inspection device 1 according to the first embodiment. As illustrated in FIG. 9, the processing unit 30 includes a captured image acquisition unit 31, a reference image generation unit 32, a comparison unit 33, a learning storage unit 34, and a learning machine 35.

The captured image acquisition unit 31 acquires a captured image on the basis of a detection signal from the detector 17. The captured image acquisition unit 31 acquires a two-dimensional image of the EUV mask 18 by associating coordinates of the stage 14 and intensity of a detection signal with each other. A gray image and a captured image have a certain correspondence relationship due to a process such as lithography, an image capturing optical system, and the like.

The learning storage unit 34 includes a storage means such as a hard disk and a memory. The learning storage unit 34 stores a learning image used for learning in the learning machine 35. A learning image includes a captured image (hereinafter, referred to as a "captured image for learning") obtained by the image capturing unit 10 capturing an image of a learning sample. The learning storage unit 34 and the storage unit 20 may be a physically single storage device or may be different storage devices.

The learning storage unit 34 stores a gray image of a learning sample (hereinafter, referred to as a "gray image for learning") and a captured image for learning in association with each other. The learning storage unit 34 stores a plurality of sets of data with a gray image for learning and a captured image for learning corresponding to the gray image for learning being one set of data. The learning storage unit 34 stores captured images for learning of various learning samples in association with gray images for learning. A pattern substrate used for only learning may be used as a learning sample, or the EUV mask 18 on which an inspection is actually performed may be used as a learning sample. The learning storage unit 34 may sequentially delete a learning image for which learning by the learning machine 35 is completed.

The learning storage unit 34 may store a captured image for learning in association with the amount of changes in a process and an optical system. The amount of changes may be, for example, the amount of changes in accordance with a change in a lithographic process for exposing and developing the EUV mask 18. Further, the amount of changes may be the amount of changes in accordance with a change in an optical system during an inspection. Specifically, the amount of changes is a degree of pattern thinning, a degree of pattern thickening, the amount of a focus shift, the amount of a brightness change in illumination light, and the like. Here, the amount of a focus shift during an inspection will be described as the amount of changes.

The learning storage unit 34 may store, as a learning image, a captured image for learning captured while changing the amount of a focus shift. For example, the detector 17 captures an image of a learning sample while changing the amount of a focus shift. In this way, the captured image acquisition unit 31 can acquire a plurality of captured images for learning having different amounts of a focus shift. The learning storage unit 34 stores the amount of a focus shift, a captured image for learning, and a gray image for learning in association with one another.

A captured image for learning may be an image of the entire pattern surface of the EUV mask 18, or may be an image of a part of a pattern surface of the EUV mask 18. For example, images of a plurality of different portions of a pattern surface may each be set as a captured image for learning, and each portion of a gray image corresponding to each of the plurality of portions of the pattern surface may be set as a gray image for learning. Then, a conversion model may be generated by performing learning by using the captured image for learning including each portion of the pattern surface and the corresponding gray image for learning.

Further, a captured image for learning may be a captured image obtained by capturing an image of a pattern used exclusively for learning, which is different from an exposure pattern provided on the EUV mask 18. Then, a conversion model may be generated by performing learning by using the captured image obtained by capturing an image of the learning pattern of the EUV mask 18 and a gray image for learning corresponding to the learning pattern.

The learning machine 35 performs learning by deep learning with a captured image for learning and a gray image for learning corresponding to the captured image for learning being associated with each other. Thus, the learning machine 35 performs learning with a plurality of sets of learning images stored in the learning storage unit 34, and generates a conversion function that converts a gray image of the EUV mask 18 into a reference image. The learning machine 35 may generate a conversion function by performing learning with a pattern used exclusively for learning, which is different from an exposure pattern provided on the EUV mask 18, as a learning sample. The learning machine 35 stores, in the learning storage unit 34, the generated conversion function as a conversion model. Accordingly, the processing unit 30 has the conversion model generated by the learning machine 35.

The learning machine 35 may perform learning with a captured image for learning, a gray image corresponding to the captured image for learning, and the amount of changes when the captured image for learning is captured being associated with each other. In this way, even when a change in process and a change in an optical system occur, the reference image generation unit 32 can appropriately generate a reference image.

Further, the learning machine 35 may perform learning with a captured image for learning, a gray image corresponding to the captured image for learning, and an instrumental error between inspection devices when the captured image for learning is captured being associated with each other. For example, a conversion model may be generated so as to include an image formation POB aberration of an objective lens, an objective mirror, or the like, misalignment of an optical member due to heat, a decrease in reflectance of a reflecting mirror, and a change in reflectance due to contamination on a mask used for exposure. For example, the learning machine 35 may generate a conversion model by performing learning with an EUV mask 18, which is the EUV mask 18 after use for exposure, as a learning sample. Further, the learning machine 35 may generate a conversion model by performing learning with an EUV mask 18, which is the EUV mask 18 after washing, as a learning sample.

The learning machine 35 performs supervised learning with a captured image for learning as a supervised image (supervised data), for example. A conversion function is a function in which a gray image of the EUV mask 18 is input and a reference image is output. The conversion function may be configured by a multi-layer network model. The learning machine 35 may determine the conversion function by machine learning based on a given feature. Alternatively, the learning machine 35 may determine the conversion function by deep learning that determines a feature.

The reference image generation unit 32 generates a reference image on the basis of a learning result in the learning machine 35. The reference image generation unit 32 generates a reference image from a gray image of the EUV mask 18 by using the conversion model generated by the learning machine 35. Specifically, the reference image generation unit 32 generates a reference image by applying the conversion model to a gray image in the storage unit 20. The reference image corresponds to an ideal good product image in which an image of a non-defective good sample is captured. The reference image generation unit 32 is an image converter that converts a gray image into a reference image by image processing.

The comparison unit 33 compares a captured image of the EUV mask 18 with a reference image generated by the reference image generation unit 32. For example, the comparison unit 33 determines a difference value between gray scale values of a reference image and a captured image, and compares the difference value with a threshold value. The comparison unit 33 detects a pattern abnormality, a defect, and the like from a comparison result between the difference value and the threshold value. In other words, a portion where a pattern abnormality occurs is, for example, a portion where a foreign substance adheres, and a difference value is greater than a threshold value. The comparison unit 33 outputs a defective portion and position coordinates thereof in association with each other. In this way, the processing unit 30 inspects the EUV mask 18 on the basis of a captured image captured by the image capturing unit 10.

Inspection Method

Figure 10:
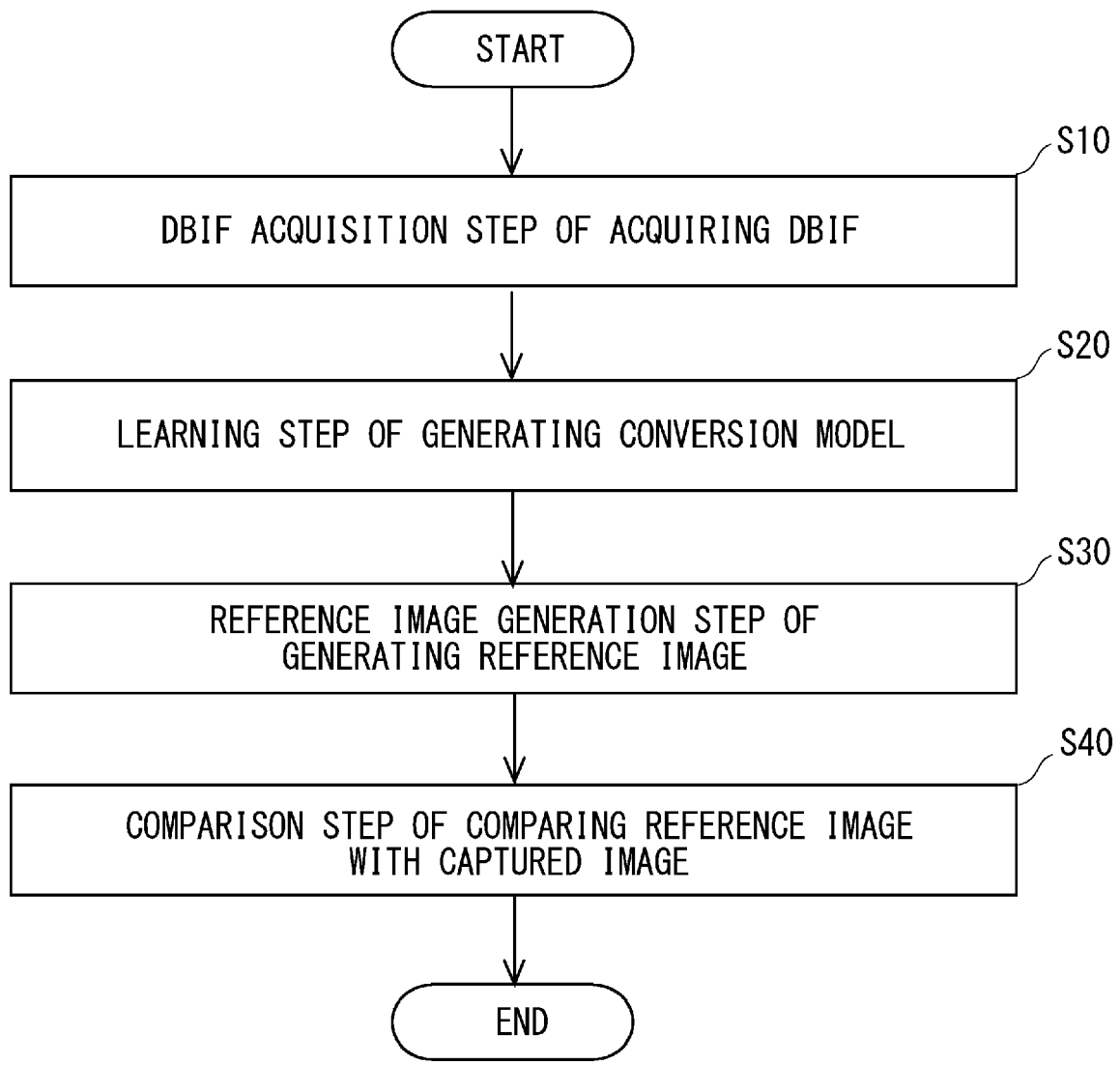
FIG. 10 is a flowchart diagram illustrating an example of an inspection method according to the first embodiment.

Next, an inspection method according to the present embodiment will be described. In the inspection method according to the present embodiment, the EUV mask 18 is inspected by using the image capturing unit 10, the storage unit 20, and the processing unit 30. FIG. 10 is a flowchart diagram illustrating an example of the inspection method according to the first embodiment. As illustrated in FIG. 10, the inspection method includes a DBIF acquisition step S10 of acquiring a DBIF, a learning step S20 of generating a conversion model, a reference image generation step S30 of generating a reference image, and a comparison step S40 of comparing the reference image with a captured image. Each of the steps will be described below.

DBIF Acquisition Step

Figure 11:
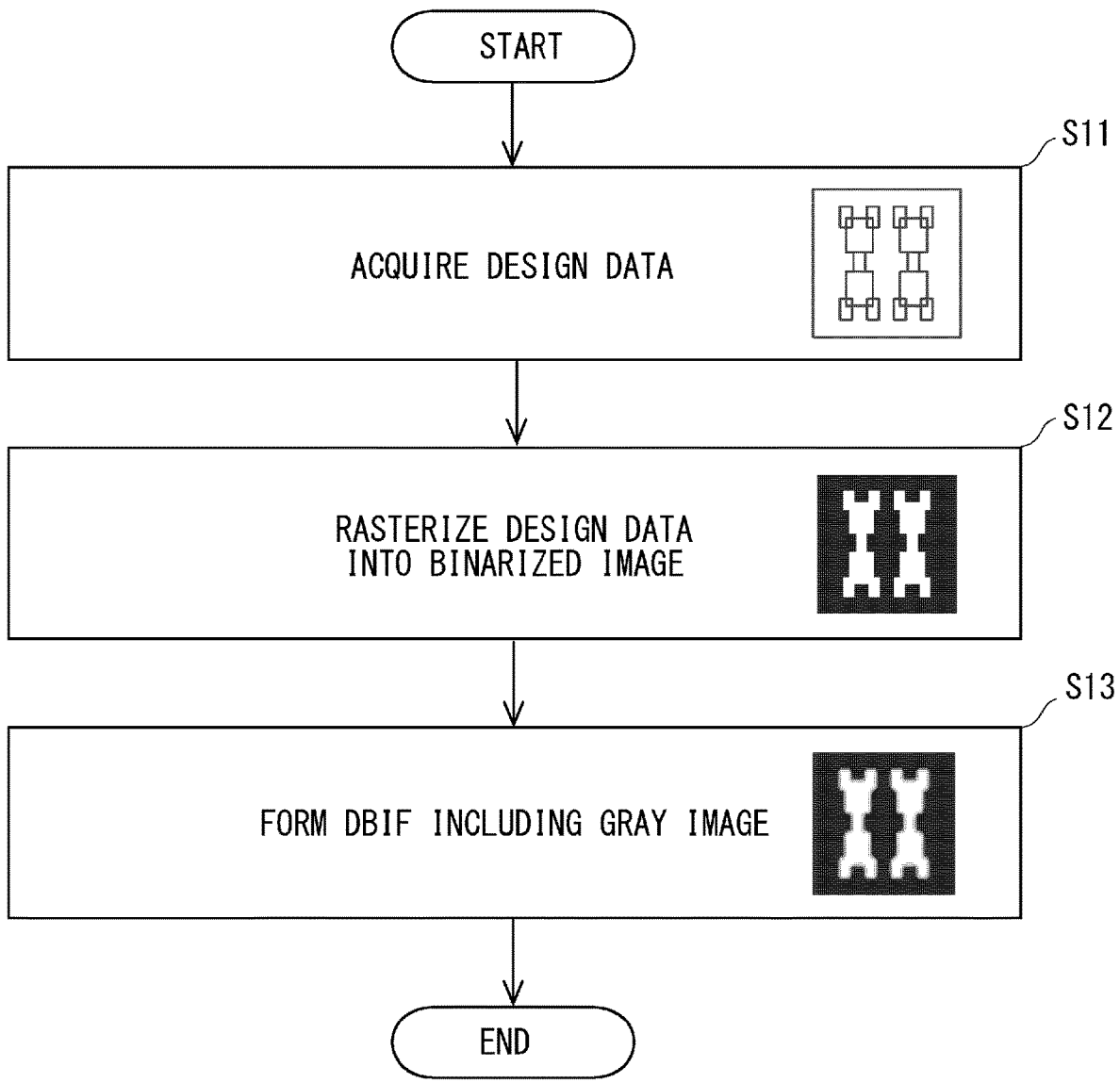
FIG. 11 is a flowchart diagram illustrating an example of a DBIF acquisition step in the inspection method according to the first embodiment.

FIG. 11 is a flowchart diagram illustrating an example of the DBIF acquisition step in the inspection method according to the first embodiment. As illustrated in step S11 in FIG. 11, first, design data is acquired. Subsequently, as illustrated in step S12, the design data is rasterized into a binarized image. The binarized image is an image based on design data of the pattern 19 of the EUV mask 18. Subsequently, as illustrated in step S13, a DBIF including a gray image is formed. The DBIF includes a gray image obtained by pixelating a binarized image rasterized from design data of a pattern. The gray image is a gray-scaled image according to a binary value included in each pixel when the binarized image is divided into a plurality of pixels. The DBIF may be formed by a mask shop that manufactures a mask, for example. In other words, the gray image may be a gray image formed from design data of the pattern 19 of the EUV mask 18 by the mask shop. An FAB may acquire the DBIF from the mask shop.

Learning Step

Figure 12:
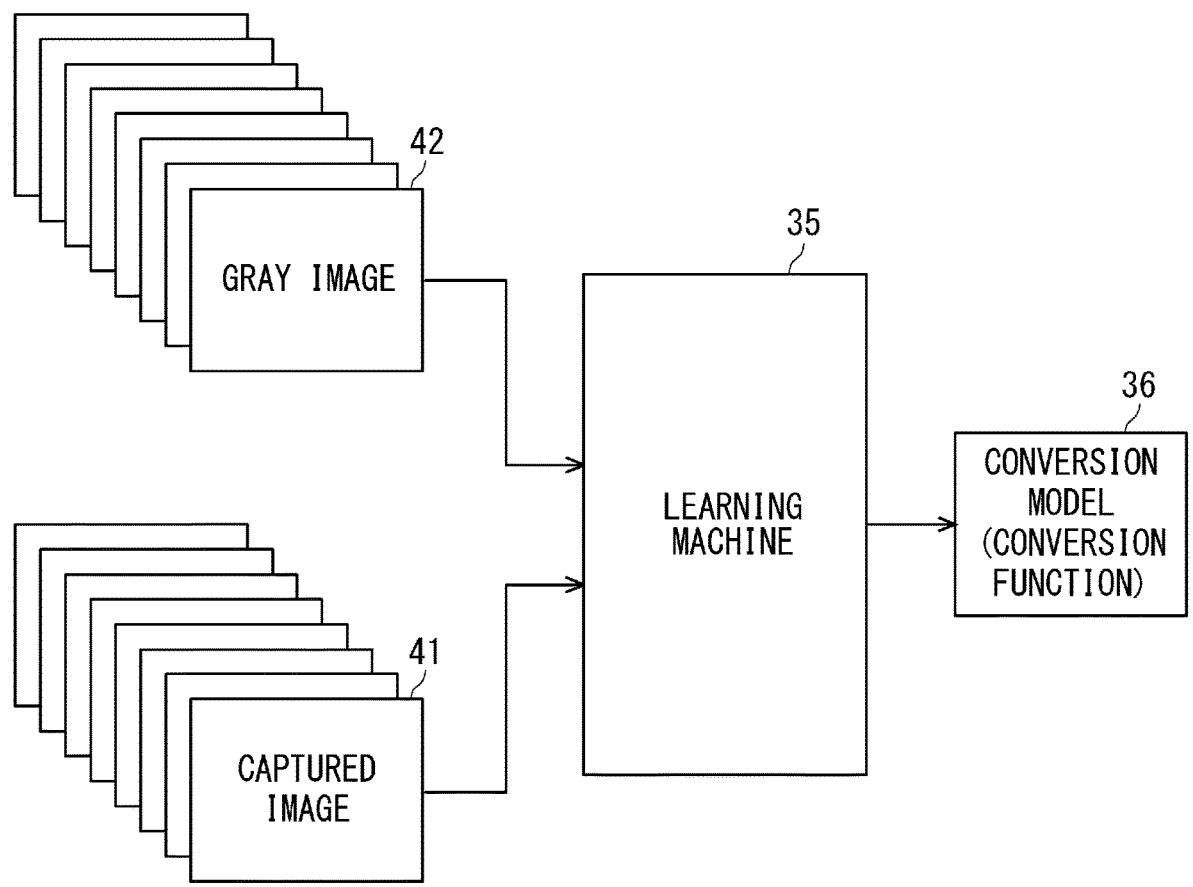
FIG. 12 is a diagram illustrating an example of a learning step in the inspection method according to the first embodiment.

FIG. 12 is a diagram illustrating an example of the learning step in the inspection method according to the first embodiment. As illustrated in FIG. 12, the learning machine 35 performs learning with a gray image 42 and a captured image 41 of a learning sample being associated with each other. In other words, the learning machine 35 learns a plurality of sets of data by deep learning by using the gray image 42 and the captured image 41 corresponding to the gray image 42 as one set. The learning machine 35 generates a conversion model 36 being a conversion function on the basis of a learning result by deep learning. In this way, the conversion model 36 is generated by performing learning by deep learning with a captured image for learning obtained by the image capturing unit capturing an image of a learning sample and a gray image corresponding to the captured image for learning being associated with each other. Note that, during learning, learning may be performed with a pattern used exclusively for learning, which is different from an exposure pattern provided on the EUV mask 18, as a learning sample.

Reference Image Generation Step

Figure 13:
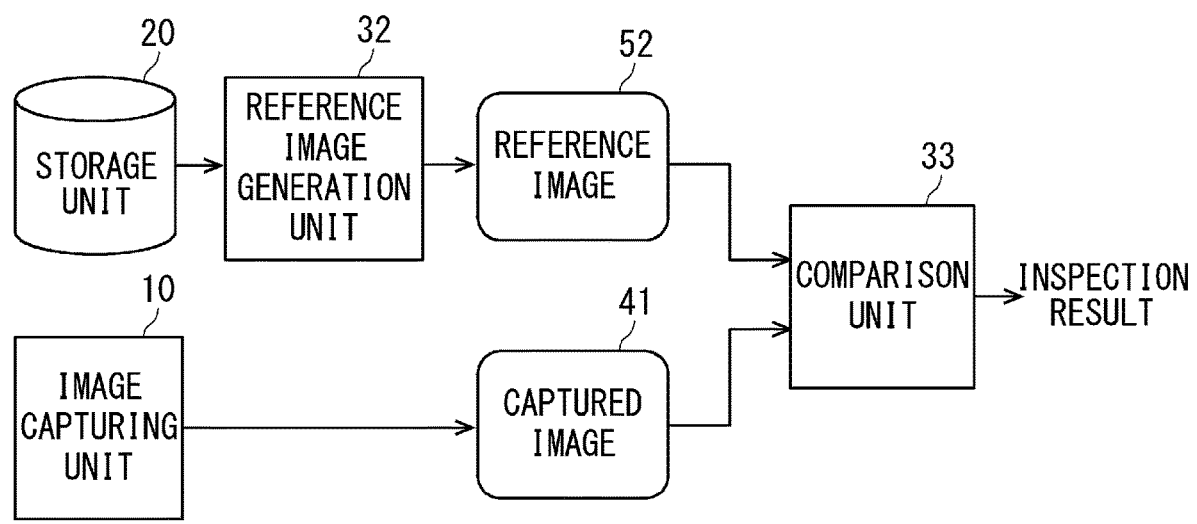
FIG. 13 is a diagram illustrating an example of a reference image generation step and a comparison step in the inspection method according to the first embodiment.

FIG. 13 is a diagram illustrating an example of the reference image generation step and the comparison step in the inspection method according to the first embodiment. As illustrated in FIG. 13, the storage unit 20 stores a DBIF which is a file including a gray image of the EUV mask 18. The reference image generation unit 32 generates a reference image 52 on the basis of the gray image 42, and outputs the reference image 52 to the comparison unit 33. Specifically, the reference image generation unit 32 generates the reference image 52 from the gray image 42 of the EUV mask 18 by using the conversion model 36.

Comparison Step

The image capturing unit 10 captures an image of the EUV mask 18 in order to acquire the captured image 41 corresponding to the gray image 42. The image capturing unit 10 outputs the captured image 41 to the comparison unit 33. The comparison unit 33 performs a pattern inspection by comparing the reference image 52 with the captured image 41. The comparison unit 33 outputs position coordinates of a defect as inspection result data.

Next, a first comparative example and a second comparative example will be described before the effects of the present embodiment are described. Subsequently, the effects of the present embodiment will be described while comparing the present embodiment with the first comparative example and the second comparative example.

First Comparative Example

Figure 14:
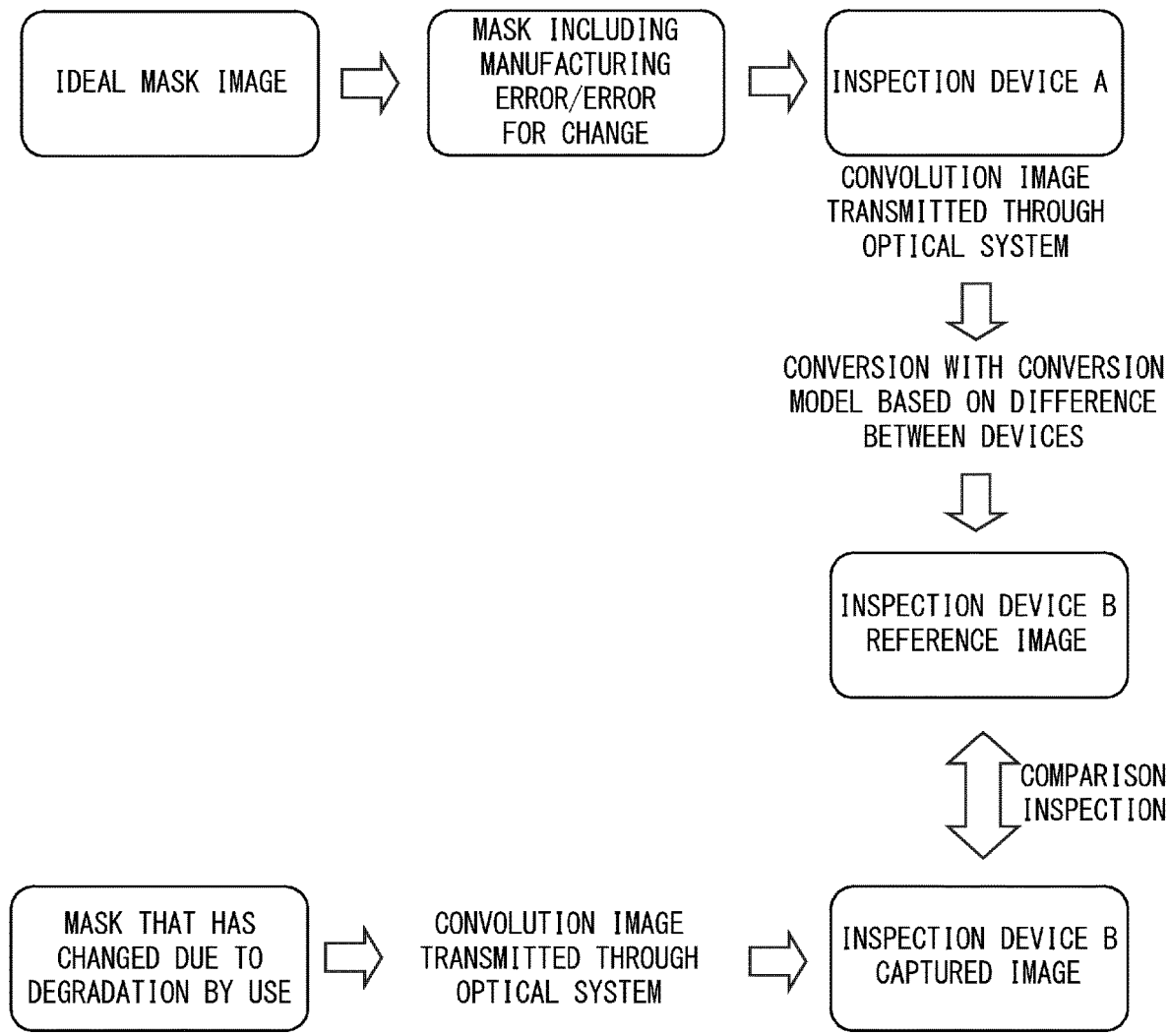
FIG. 14 is a diagram illustrating an example of an MtM inspection according to a first comparative example.

FIG. 14 is a diagram illustrating an example of an MtM inspection according to the first comparative example. As illustrated in FIG. 14, in the MtM inspection, a mask image including a manufacturing error and an error for change with respect to an ideal mask image is acquired by an inspection device A. The acquired image includes information to be lost such as an unresolved image, an error such as AF shaking, and an error for each device.

Subsequently, the image acquired by the inspection device A is converted into a reference image of an inspection device B by a conversion model so as to include use of a mask and a difference between the inspection devices. Such a reference image is obtained by conversion with an incomplete conversion model based on incomplete information, and thus the reference image may include an error for each device.

On the other hand, the inspection device B acquires an image of a mask that has changed due to degradation caused by exposure or the like. A mask that has changed due to degradation by use has a decreased reflectance and a changed pattern. Thus, the image acquired by the inspection device B includes information to be lost such as an unresolved image, an error such as AF shaking, and an error for each device similarly to the image acquired by the inspection device A.

Therefore, when a pattern is inspected by comparing a reference image with a captured image, various errors are included in a process performed by a system (focus condition, resolution). For example, this is because a conversion model is generated on the basis of an image of the inspection device A including an error and an image of the inspection device B including an error. Further, an error due to conversion using the model may be included. Furthermore, this is because a change in mask is not taken into consideration. Even in such a case, some contained errors can be corrected by a correction of an optical condition and the like, and a conversion model. However, particularly, when a fine pattern is included as in a mask used for EUV light or the like, a difference between inspection devices cannot be corrected by a correction of an optical condition and a conversion model, and it is difficult to improve inspection accuracy.

Second Comparative Example

Figure 15:
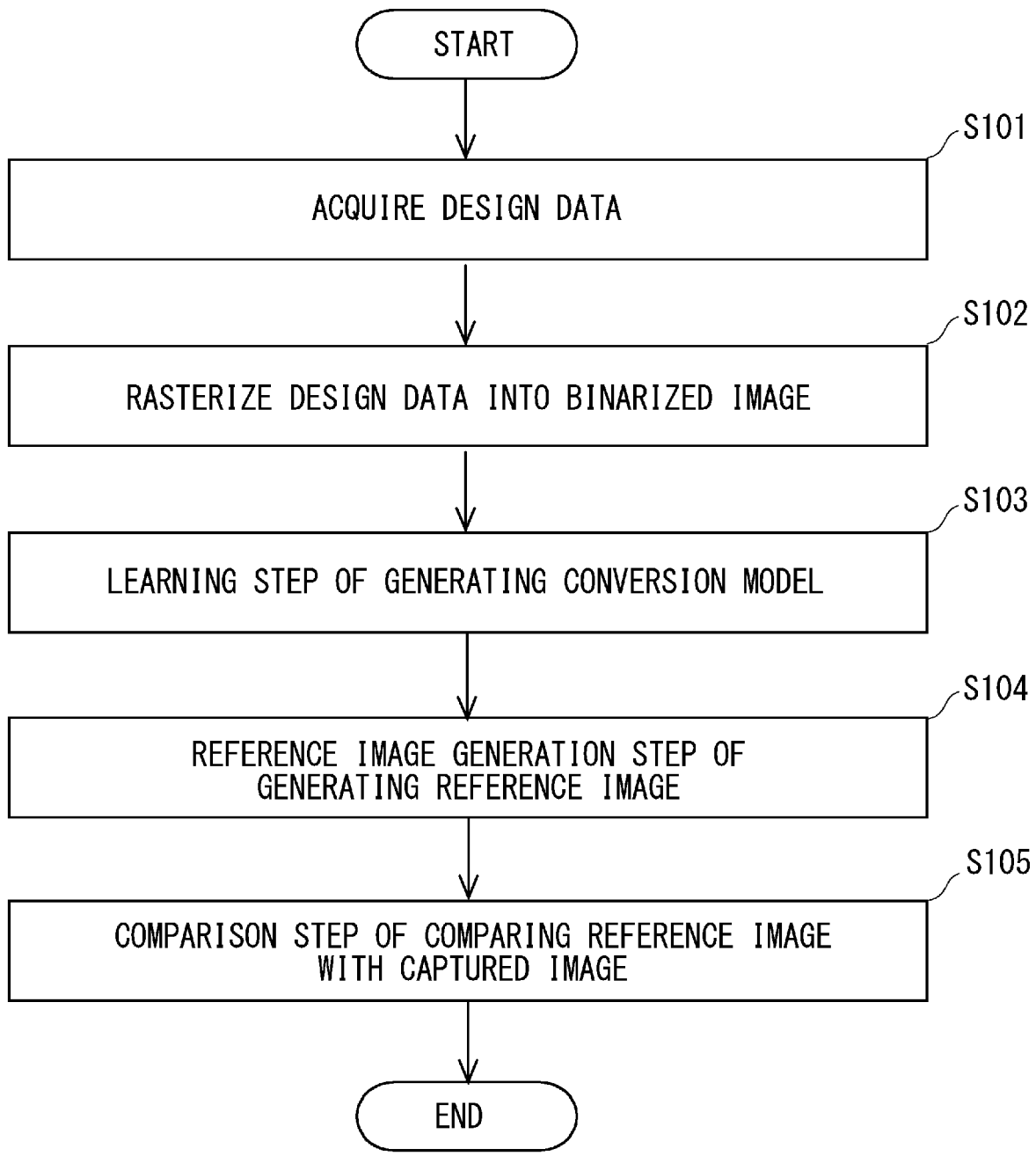
FIG. 15 is a flowchart diagram illustrating an example of a DDB inspection according to a second comparative example.

FIG. 15 is a flowchart diagram illustrating an example of a DDB inspection according to the second comparative example. As illustrated in step S101 in FIG. 15, design data is acquired in the DDB inspection. Subsequently, as illustrated in step S102, the design data is rasterized into a binarized image. Subsequently, as illustrated in step S103, a conversion model is generated. In the DDB inspection, for example, a conversion model is generated by performing learning with the binarized image based on the design data and a captured image, which are associated with each other, as a learning sample. Subsequently, as illustrated in step S104, a reference image is generated. In the DDB inspection, the reference image is generated from the binarized image of the EUV mask 18 by using the generated conversion model. Subsequently, as illustrated in step S105, the reference image and the captured image are compared.

In the DDB inspection, a reference image is generated from a binarized image obtained by rasterizing design data. Thus, a complex and expensive system is needed in order to generate a reference image. Further, for application to another inspection device, a reference image needs to be newly generated from design data, which makes it difficult to reduce a manufacturing cost.

Next, the effects of the present embodiment will be described. In the present embodiment, a reference image can be generated for each inspection device from a gray image of a DBIF. The gray image of the DBIF does not include calibration information for each inspection device and for each inspection target. In other words, the DBIF that does not include a difference between inspection devices and a difference between inspection targets can be shared with another inspection device. Thus, an inspection can be performed without being affected by a difference between inspection devices as in the MtM inspection in which "golden sharing" of a captured image of a mask is performed. In this way, inspection accuracy can be improved for each inspection device.

The gray image of the DBIF does not include calibration information for each inspection device, and can be shared among a plurality of inspection devices. Thus, a cost for an inspection can be reduced. In contrast, in the DDB inspection, a conversion model is generated for each inspection device from a binarized image based on design data, and a reference image is generated, and thus a complex and expensive system is needed. Thus, it is difficult to reduce a cost for an inspection.

Further, since the gray image of the DBIF can be shared among a plurality of inspection devices, a mask on which the DD inspection cannot be performed, such as a single die mask, can be accurately inspected. Furthermore, since a difference between inspection devices does not affect the inspection, a fine pattern used for exposure with light having a short wavelength such as EUV light can be inspected.

The learning machine 35 performs learning by deep learning. Thus, the conversion model 36 for appropriately generating a reference image can be generated. In this way, a comparison inspection using the appropriate reference image 52 can be achieved, and an inspection with high accuracy can be performed. For example, when a differential signal not indicating a true defect is detected as a signal indicating a pseudo defect, whether a defect or a pseudo defect can be determined by learning a pseudo defect in advance, and only a true defect can be detected.

Second Embodiment

Figure 16:
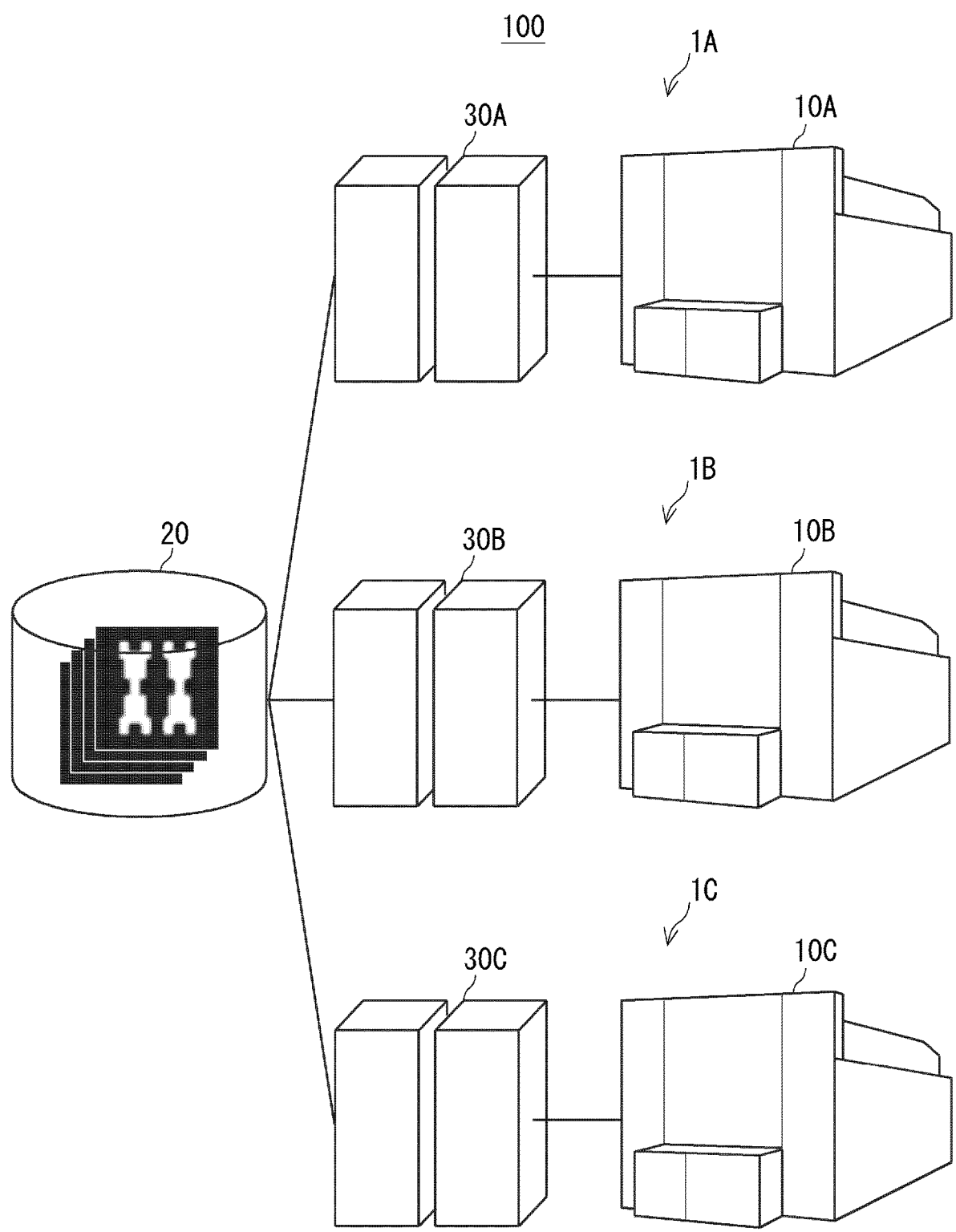
FIG. 16 is a schematic diagram illustrating an example of an inspection system according to a second embodiment.

Next, an inspection system according to a second embodiment will be described. FIG. 16 is a schematic diagram illustrating an example of the inspection system according to the second embodiment. As illustrated in FIG. 16, an inspection system 100 includes a plurality of inspection devices 1A to 1C. The inspection device 1A includes an image capturing unit 10A, a storage unit 20, and a processing unit 30A. The inspection device 1B includes an image capturing unit 10B, the storage unit 20, and a processing unit 30B. The inspection device 1C includes an image capturing unit 10C, the storage unit 20, and a processing unit 30C. The inspection devices 1A to 1C share the storage unit 20. Thus, the inspection devices 1A to 1C can share a DBIF.

Each of the inspection devices 1A to 1C generates a reference image optimized for each of the inspection devices 1A to 1C by using the DBIF stored in the storage unit 20. Then, each of the inspection devices 1A to 1C inspects a pattern by comparing the reference image generated in each of the inspection devices 1A to 1C with a captured image.

According to the present embodiment, the inspection system 100 shares a DBIF, and thus a cost for generating the DBIF from design data can be reduced. Further, since the inspection system 100 generates a conversion model for each inspection device with reference to a shared DBIF, the inspection system 100 can reduce an influence of a difference between the inspection devices. In addition, a change due to a mask can be suppressed. Since a conversion model is generated for each inspection device, an inspection condition such as POB can be set for each of the inspection devices 1A to 1C, and thus, performance of each of the inspection devices 1A to 1C can be fully exhibited. Other configurations and effects are included in the description of the first embodiment.

While the first and second embodiments according to the present disclosure have been described above, the present disclosure includes any suitable modification that does not impair the object and the advantages of the present disclosure, and, furthermore, the present disclosure is not limited to the embodiments described above. A combination of the configurations of the first and second embodiments is also included in the embodiments. Further, an inspection program causing a computer to perform an inspection method also falls in a range of technical ideas of the embodiments.

A part or the whole of the processing described above may be performed by a computer program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line. The first and second embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. An EUV mask inspection device comprising:
   an image capturing unit configured to capture an image of an EUV mask provided with a pattern;
   a storage unit storing a database intermediate file including a gray image obtained by pixelating a binarized image rasterized from design data of the pattern; and
   a processing unit configured to inspect the EUV mask on the basis of a captured image obtained by the image capturing unit capturing the image of the EUV mask,
   wherein the processing unit includes:
      a learning machine;
      a conversion model generated by the learning machine configured to perform learning by deep learning with a training image for learning obtained by the image capturing unit capturing an image of a learning sample and the gray image corresponding to the training image being associated with each other,
      a reference image generation unit configured to generate a reference image from the gray image by using the conversion model, and
      a comparison unit configured to compare the reference image with the captured image, wherein
   the binarized image is an image in which a portion where the pattern is formed has one of a first value and a second value, and a portion where the pattern is not formed has the other of the first value and the second value based on the design data of the pattern of the EUV mask, the gray image is a gray-scaled image according to a binary value included in each pixel when the binarized image is divided into a plurality of pixels, wherein the pixel having the second value is indicated in black, the pixel having the first value is indicated in white, and the pixel being the boundary portion between the first value and the second value is indicated by a gray scale interpolated from the pixel having the first value and the pixel having the second value, and
   the conversion model is a conversion function generated by learning by deep learning with the training image and the gray image corresponding to the training image being associated with each other, and is the conversion function for generating a reference image from the gray image.

2. The EUV mask inspection device according to claim 1, wherein the learning machine performs learning with a pattern used exclusively for learning, which is different from an exposure pattern provided on the EUV mask, as the learning sample.

3. The EUV mask inspection device according to claim 1, wherein the learning machine generates the conversion model by performing learning with an EUV mask, which is the EUV mask after use for exposure, as the learning sample.

4. The EUV mask inspection device according to claim 1, wherein the learning machine generates the conversion model by performing learning with an EUV mask, which is the EUV mask after washing, as the learning sample.

5. An EUV mask inspection method for inspecting an EUV mask provided with a pattern by using an image capturing unit configured to capture an image of the EUV mask, the EUV mask inspection method comprising:
   a DBIF acquisition step of acquiring a database intermediate file including a gray image obtained by pixelating a binarized image rasterized from design data of the pattern;
   a learning step of generating a conversion model by performing learning by deep learning with a training image for learning obtained by the image capturing unit capturing an image of a learning sample and the gray image corresponding to the captured image for learning being associated with each other;
   a reference image generation step of generating a reference image from the gray image by using the conversion model; and
   a comparison step of comparing the reference image with a captured image obtained by capturing an image of the EUV mask, wherein
the binarized image is an image in which a portion where the pattern is formed has one of a first value and a second value, and a portion where the pattern is not formed has the other of the first value and the second value based on the design data of the pattern of the EUV mask,
the gray image is a gray-scaled image according to a binary value included in each pixel when the binarized image is divided into a plurality of pixels, wherein the pixel having the second value is indicated in black, the pixel having the first value is indicated in white, and the pixel being the boundary portion between the first value and the second value is indicated by a gray scale interpolated from the pixel having the first value and the pixel having the second value, and
the conversion model is a conversion function generated by learning by deep learning with the training image and the gray image corresponding to the training image being associated with each other, and is the conversion function for generating a reference image from the gray image.

6. The EUV mask inspection method according to claim 5, wherein the gray image in the DBIF acquisition step is a gray image formed from design data of the pattern by a mask shop that manufactures the EUV mask.

7. The EUV mask inspection method according to claim 5, wherein, in the learning step, learning is performed with a pattern used exclusively for learning, which is different from an exposure pattern provided on the EUV mask, as the learning sample.

8. The EUV mask inspection method according to claim 5, wherein, in the learning step, the conversion model is generated by performing learning with an EUV mask, which is the EUV mask after use for exposure, as the learning sample.

9. The EUV mask inspection method according to claim 5, wherein, in the learning step, the conversion model is generated by performing learning with an EUV mask, which is the EUV mask after washing, as the learning sample.

10. A non-transitory computer-readable medium storing an EUV mask inspection program for inspecting an EUV mask provided with a pattern by using an image capturing unit configured to capture an image of the EUV mask, and further storing a learning machine, the non-transitory computer-readable medium causing a computer to:
acquire a database intermediate file including a gray image obtained by pixelating a binarized image rasterized from design data of the pattern;
generate a conversion model by performing learning by deep learning with a training image for learning obtained by the image capturing unit capturing an image of a learning sample and the gray image corresponding to the captured image for learning being associated with each other;
generate a reference image from the gray image by using the conversion model; and
compare the reference image with a captured image obtained by capturing an image of the EUV mask,
wherein
the binarized image is an image in which a portion where the pattern is formed has one of a first value and a second value, and a portion where the pattern is not formed has the other of the first value and the second value based on the design data of the pattern of the EUV mask,
the gray image is a gray-scaled image according to a binary value included in each pixel when the binarized image is divided into a plurality of pixels, wherein the pixel having the second value is indicated in black, the pixel having the first value is indicated in white, and the pixel being the boundary portion between the first value and the second value is indicated by a gray scale interpolated from the pixel having the first value and the pixel having the second value, and
the conversion model is a conversion function generated by learning by deep learning with the training image and the gray image corresponding to the training image being associated with each other, and is the conversion function for generating a reference image from the gray image.

11. The non-transitory computer-readable medium storing the EUV mask inspection program according to claim 10, further causing a computer to perform learning with a pattern used exclusively for learning, which is different from an exposure pattern provided on the EUV mask, as the learning sample, when the conversion model is generated.

12. The non-transitory computer-readable medium storing the EUV mask inspection program according to claim 10, further causing a computer to generate the conversion model by performing learning with an EUV mask, which is the EUV mask after use for exposure, as the learning sample, when the conversion model is generated.

13. The non-transitory computer-readable medium storing the EUV mask inspection program according to claim 10, further causing a computer to generate the conversion model by performing learning with an EUV mask, which is the EUV mask after washing, as the learning sample, when the conversion model is generated.

14. An EUV mask inspection system comprising:
a storage unit;
a first inspection device; and
a second inspection device, wherein the first inspection device includes:
a first image capturing unit configured to capture an image of a first EUV mask provided with a pattern, and
a first processing unit configured to inspect the first EUV mask on the basis of a first captured image obtained by the first image capturing unit capturing an image of the first EUV mask,
the second inspection device includes:
a second image capturing unit configured to capture an image of a second EUV mask provided with a pattern, and
a second processing unit configured to inspect the second EUV mask on the basis of a second captured image obtained by the second image capturing unit capturing an image of the second EUV mask,
the first inspection device and the second inspection device sharing the storage unit, and the storage unit storing a database intermediate file including a gray image obtained by pixelating a binarized image rasterized from design data of the pattern,
the first processing unit includes:
a first learning machine,
a first conversion model generated by the first learning machine configured to perform learning by deep learning with a first training image for learning obtained by the first image capturing unit capturing an image of a first learning sample and the gray image corresponding to the first training image being associated with each other, a first reference image generation unit configured to generate a first reference image from the gray image by using the first conversion model, and a first comparison unit configured to compare the first reference image with the first captured image, and the second processing unit includes:

a second learning machine, a second conversion model generated by the second learning machine configured to perform learning by deep learning with a second training image for learning obtained by the second image capturing unit capturing an image of a second learning sample and the gray image corresponding to the second training image being associated with each other, a second reference image generation unit configured to generate a second reference image from the gray image by using the second conversion model, and a second comparison unit configured to compare the second reference image with the second captured image, wherein the binarized image is an image in which a portion where the pattern is formed has one of a first value and a second value, and a portion where the pattern is not formed has the other of the first value and the second value based on the design data of the pattern of the EUV mask, the gray image is a gray-scaled image according to a binary value included in each pixel when the binarized image is divided into a plurality of pixels, wherein the pixel having the second value is indicated in black, the pixel having the first value is indicated in white, and the pixel being the boundary portion between the first value and the second value is indicated by a gray scale interpolated from the pixel having the first value and the pixel having the second value, and the conversion model is a conversion function generated by learning by deep learning with the training image and the gray image corresponding to the training image being associated with each other, and is the conversion function for generating a reference image from the gray image, the gray image obtained by pixelating a binarized image rasterized from design data of the pattern is shared by the first inspection device and the second inspection device, and the gray image does not differ between the first inspection device and the second inspection device.

15. The EUV mask inspection system according to claim 14, wherein the first learning machine generates the first conversion model by performing learning with a first EUV mask, which is the first EUV mask after use for exposure, as the first learning sample, and the second learning machine generates the second conversion model by performing learning with a second EUV mask, which is the second EUV mask after use for exposure, as the second learning sample.

16. The EUV mask inspection system according to claim 14, wherein the first learning machine generates the first conversion model by performing learning with a first EUV mask, which is the first EUV mask after washing, as the first learning sample, and the second learning machine generates the second conversion model by performing learning with a second EUV mask, which is the EUV mask after washing, as the second learning sample.

17. A learning method for a conversion model, the learning method comprising:

an acquisition step of acquiring a gray image obtained by pixelating a binarized image rasterized from design data of the pattern; and a learning step of the conversion model by performing learning with a plurality of training images for learning obtained by the image capturing unit capturing an image of a learning sample and a plurality of the gray images corresponding to the training images being associated with each other, wherein the binarized image is an image in which a portion where the pattern is formed has one of a first value and a second value, and a portion where the pattern is not formed has the other of the first value and the second value based on the design data of the pattern of the EUV mask, the gray image is a gray-scaled image according to a binary value included in each pixel when the binarized image is divided into a plurality of pixels, wherein the pixel having the second value is indicated in black, the pixel having the first value is indicated in white, and the pixel being the boundary portion between the first value and the second value is indicated by a gray scale interpolated from the pixel having the first value and the pixel having the second value, and the conversion model is a conversion function generated by learning, and is the conversion function for generating a reference image from the gray image.

* * * * *